(12) United States Patent
Aoki et al.

(10) Patent No.: US 10,315,193 B2
(45) Date of Patent: Jun. 11, 2019

(54) HONEYCOMB STRUCTURE

(71) Applicants: NGK INSULATORS, LTD., Nagoya (JP); HONDA MOTOR CO., LTD., Tokyo (JP)

(72) Inventors: Takashi Aoki, Nagoya (JP); Norihiro Wakida, Nagoya (JP); Yoshiaki Hatakeyama, Wako (JP)

(73) Assignees: NGK Insulators, Ltd., Nagoya (JP); Honda Motor Co., Ltd., Minato-Ku (JP)

( * ) Notice: Subject to any disclaimer, the term of this patent is extended or adjusted under 35 U.S.C. 154(b) by 0 days.

(21) Appl. No.: 15/662,355

(22) Filed: Jul. 28, 2017

(65) Prior Publication Data
US 2017/0326539 A1  Nov. 16, 2017

Related U.S. Application Data

(63) Continuation of application No. PCT/JP2016/053457, filed on Feb. 5, 2016.

(30) Foreign Application Priority Data

Feb. 5, 2015 (JP) .................................. 2015-021576

(51) Int. Cl.
*B01J 35/04* (2006.01)
*B01D 39/20* (2006.01)
(Continued)

(52) U.S. Cl.
CPC .............. *B01J 35/04* (2013.01); *B01D 39/20* (2013.01); *B01D 46/247* (2013.01);
(Continued)

(58) Field of Classification Search
None
See application file for complete search history.

(56) References Cited

U.S. PATENT DOCUMENTS 7,488,412 B2 * 2/2009 Abe et al. ................ F01N 3/28
2014/0087128 A1 3/2014 Yanase et al.
(Continued)

FOREIGN PATENT DOCUMENTS

DE  10 2014 008 271 A1  12/2014
JP  03-169347 A1  7/1991
(Continued)

OTHER PUBLICATIONS

International Search Report and Written Opinion (Application No. PCT/JP2016/053457) dated Apr. 5, 2016.
(Continued)

*Primary Examiner* — David Sample
*Assistant Examiner* — Elizabeth Collister
(74) *Attorney, Agent, or Firm* — Burr & Brown, PLLC (57) ABSTRACT

A honeycomb structure includes a pillar-shaped honeycomb structure body including porous partition walls defining and forming a plurality of cells which extend from an inflow end face to an outflow end face, and a porous outer wall surrounding the partition walls, a porous supporting bulge disposed to extend out from a circumference of the outer wall so that at least a part of the outer wall is exposed, and plugging portions arranged in open ends of the cells, and the supporting bulge has support portions and a side wall portion, and the partition walls and the outer wall of the honeycomb structure body and the support portions and the side wall portion of the supporting bulge are all formed monolithically by formation of a ceramic raw material.

9 Claims, 5 Drawing Sheets

(51) Int. Cl.
*C04B 35/195* (2006.01)
*C04B 38/00* (2006.01)
*C04B 38/06* (2006.01)
*F01N 3/022* (2006.01)
*B01D 46/24* (2006.01)
*B01D 53/94* (2006.01)
*B01J 23/745* (2006.01)
*B01J 37/00* (2006.01)
*B01J 37/08* (2006.01)
*F01N 3/28* (2006.01)
*B01J 35/10* (2006.01)
*C04B 111/00* (2006.01)
*C04B 111/20* (2006.01)

(52) U.S. Cl.
CPC ..... *B01D 46/2455* (2013.01); *B01D 46/2474* (2013.01); *B01D 53/94* (2013.01); *B01J 23/745* (2013.01); *B01J 35/10* (2013.01); *B01J 37/0009* (2013.01); *B01J 37/0018* (2013.01); *B01J 37/08* (2013.01); *C04B 35/195* (2013.01); *C04B 38/00* (2013.01); *C04B 38/0006* (2013.01); *C04B 38/0012* (2013.01); *C04B 38/06* (2013.01); *C04B 38/0695* (2013.01); *F01N 3/022* (2013.01); *F01N 3/0222* (2013.01); *F01N 3/28* (2013.01); *F01N 3/2803* (2013.01); *F01N 3/2842* (2013.01); *B01D 2046/2433* (2013.01); *B01D 2046/2437* (2013.01); *B01D 2046/2481* (2013.01); *B01D 2279/30* (2013.01); *C04B 2111/0081* (2013.01); *C04B 2111/00793* (2013.01); *C04B 2111/2084* (2013.01); *C04B 2235/3217* (2013.01); *C04B 2235/3218* (2013.01); *C04B 2235/349* (2013.01); *C04B 2235/3418* (2013.01); *C04B 2235/3445* (2013.01); *C04B 2235/5292* (2013.01); *C04B 2235/606* (2013.01); *C04B 2235/6021* (2013.01); *F01N 2330/10* (2013.01); *F01N 2330/30* (2013.01); *F01N 2330/60* (2013.01)

(56) References Cited

U.S. PATENT DOCUMENTS

2014/0123612 A1 5/2014 Yamada et al.
2014/0363616 A1 12/2014 Aoyama

FOREIGN PATENT DOCUMENTS

| JP | 2001-314718 | A1 | 11/2001 |
| JP | 2005-125182 | A1 | 5/2005 |
| JP | 2014-064978 | A1 | 4/2014 |
| WO | 2014/061320 | A1 | 4/2014 |

OTHER PUBLICATIONS

German Office Action, German Application No. 11 2016 000 619.5, dated Apr. 5, 2018 (6 pages).

* cited by examiner

HONEYCOMB STRUCTURE

BACKGROUND OF THE INVENTION

1. Field of the Invention

The present invention relates to a honeycomb structure, and more particularly, it relates to a honeycomb structure which is easily manufactured to be excellent in thermal shock resistance, and is prevented from being shifted in a can member when the honeycomb structure is received in the can member which receives the honeycomb structure.

2. Description of Related Art

Honeycomb structures have broadly been used in filters, catalyst carriers and the like, and have especially broadly been used as exhaust gas purifying and exhaust gas treating catalyst carriers, filters and the like in internal combustion engines such as a gasoline engine and a diesel engine, and burning devices.

Especially, the honeycomb structure for use as the exhaust gas purifying catalyst carrier or filter or the like in a gasoline engine car, a diesel engine car or the like is required to have an improved purification performance to cope with exhaust gas regulations which are yearly strengthened in consideration of environmental problems. Furthermore, this honeycomb structure is required to be lightened for the purpose of increasing a temperature raising rate of a catalyst to activate the catalyst in an early period. On the other hand, from the aspect of engine development, directions for low fuel consumption and high output are remarkably indicated, and to cope with such a situation, the honeycomb structure is also required to decrease its pressure loss. Further for the purpose of using the honeycomb structure as the filter for a long period of time, it is necessary to burn and remove particulate matter (hereinafter also referred to as "PM") deposited in the honeycomb structure. Also with respect to a burning efficiency of the particulate matter, it is preferable that the honeycomb structure has a lower heat capacity, and the honeycomb structure is required to be lightened. Furthermore, in circumstances where the honeycomb structure is used as the filter onto which the catalyst is loaded, it is also required to increase an amount of the catalyst to be loaded, for the improvement of the purification performance. Heretofore, such a honeycomb structure has been used in a receiving (hereinafter also referred to as "canning") state of a can member which receives the honeycomb structure.

Such problems as described above are solved, for example, by decreasing a thickness of partition walls of the honeycomb structure or increasing a porosity of a substrate. However, when the thickness of the partition walls of the honeycomb structure is decreased or the porosity of the substrate is increased, it becomes difficult to acquire an isostatic strength of the honeycomb structure. When the isostatic strength of the honeycomb structure is low, the honeycomb structure might be damaged by a holding pressure applied to a circumference of the honeycomb structure at the time of receiving the honeycomb structure in the can member. When the holding pressure is decreased to avoid the damages on the honeycomb structure, there is the problem that the honeycomb structure shifts from a predetermined received position in circumstances where an exhaust gas pressure or vibration is applied to the honeycomb structure.

Therefore, to solve such problems as described above, an exhaust gas purifying honeycomb structure for a diesel engine is disclosed in which an uneven portion is provided on an outer wall to inhibit the shift of the honeycomb structure from the predetermined received position (see Patent Document 1). The honeycomb structure of Patent Document 1 is obtained by firing a honeycomb formed body formed by extrusion, grinding an outer wall of the honeycomb formed body, and then providing the outer wall with a circumferential coating material, so that the honeycomb structure has the uneven portion provided on the outer wall. According to this configuration, also in circumstances where a porosity of partition walls of the honeycomb structure is high (i.e., the isostatic strength is low), the honeycomb structure can be held in the can member by the uneven portion, and hence it is not necessary to apply any high holding pressure to the honeycomb structure. Such a honeycomb structure is suitable as the exhaust gas purifying filter for the diesel engine in which an exhaust gas temperature is comparatively low.

CITATION LIST

Patent Documents

[Patent Document 1] JP-A-2005-125182

SUMMARY OF THE INVENTION

Problem to be Solved by the Invention

However, an exhaust gas temperature of a gasoline engine is higher than an exhaust gas temperature of a diesel engine. Therefore, in using a honeycomb structure having an outer wall made of a circumferential coating material as an exhaust gas purifying filter for the gasoline engine, the following problem is present. That is, there is a difference in thermal expansion ratio between the honeycomb structure and the circumferential coating material, and hence thermal stress is generated in a boundary between the honeycomb structure and the circumferential coating material at a time of exposure to a high-temperature exhaust gas, whereby there is the problem that a thermal shock resistance of the honeycomb structure becomes insufficient. Furthermore, even the exhaust gas temperature of the diesel engine occasionally becomes as high as that of the gasoline engine, which depends on a position to which the honeycomb structure is attached, and there has been the problem that the thermal shock resistance of the honeycomb structure having the circumferential coating material becomes insufficient.

The present invention has been developed in view of these problems, and according to the present invention, it is possible to decrease a thickness of partition walls of a honeycomb structure, it is also possible to increase a porosity of a substrate, and there is provided the honeycomb structure which is hard to shift in a can member and is excellent in thermal shock resistance.

Means for Solving the Problem

According to the present invention, there is provided a honeycomb structure as follows.

According to a first aspect or the present invention, a honeycomb structure is provided including a pillar-shaped honeycomb structure body including porous partition walls defining and forming a plurality of cells which extend from an inflow end face to an outflow end face and become through channels for fluid, and a porous outer wall surrounding the partition walls, a porous supporting bulge disposed to extend out from a circumference of the outer wall so that at least a part of the outer wall is exposed, and plugging portions arranged in open ends of predetermined cells in the inflow end face and open ends of the residual cells in the outflow end face, wherein the supporting bulge has a plurality of support portions protruding from the circumference of the outer wall toward the outside of the outer wall, and at least one side wall portion supported by the support portions, and the partition walls and the outer wall of the honeycomb structure body and the support portions and the side wall portion of the supporting bulge are all formed monolithically by formation of a ceramic raw material.

According to a second aspect of the present invention, the honeycomb structure according to the above first aspect is provided, wherein porosities of the honeycomb structure body and the supporting bulge are both from 46 to 75%.

According to a third aspect of the present invention, the honeycomb structure according to the above first or second aspects is provided, wherein average pore diameters of the honeycomb structure body and the supporting bulge are both from 11 to 30 μm.

According to a fourth aspect of the present invention, the honeycomb structure according to any one of the above first to third aspects is provided, wherein a thickness of the partition walls of the honeycomb structure body is from 0.14 to 0.41 mm.

According to a fifth aspect of the present invention, the honeycomb structure according to any one of the above first to fourth aspects is provided, wherein the supporting bulge further has a plurality of beam portions which are formed monolithically with the support portions and each of which is disposed between two of the plurality of support portions.

According to a sixth aspect of the present invention, the honeycomb structure according to the above fifth aspect is provided, wherein the supporting bulge has supporting bulge cells defined by the outer wall of the honeycomb structure body, the support portions of the supporting bulge, the beam portions of the supporting bulge, and the side wall portion of the supporting bulge, and the supporting bulge cells are through-holes passing through the supporting bulge from the side of the inflow end face to the side of the outflow end face.

According to a seventh aspect of the present invention, the honeycomb structure according to the above fifth or sixth aspects is provided, wherein in a cross section which is vertical to an extending direction of the cells, the thickness of the partition walls, a thickness of the support portions and a thickness of the beam portions are the same.

According to an eighth aspect of the present invention, the honeycomb structure according to any one of the above fifth to seventh aspects is provided, wherein a cell density of the cells formed in the honeycomb structure body and a cell density of the supporting bulge cells formed in the supporting bulge are the same.

According to a ninth aspect of the present invention, the honeycomb structure according to any one of the above first to eighth aspects is provided, wherein a value obtained by dividing a surface area S2 of a portion of the outer wall of the honeycomb structure body which is covered with the supporting bulge by a sum of a surface area S1 of a portion of the outer wall of the honeycomb structure body which is not covered with the supporting bulge and the surface area S2 satisfies the following relation (1):

$$0.01 < S2/(S1+S2) < 0.80 \tag{1}.$$

Effect of the Invention

According to a honeycomb structure of the present invention, it is possible to effectively inhibit shift of the honeycomb structure in a can member when receiving the honeycomb structure in the can member to use the honeycomb structure as a filter, a catalyst carrier or the like. Furthermore, in the honeycomb structure of the present invention, a honeycomb structure body and a supporting bulge are monolithically formed, circumferential coating materials are not used in an outer wall, and hence the honeycomb structure is excellent in thermal shock resistance. Furthermore, the honeycomb structure of the present invention is excellent in thermal shock resistance as described above, and hence it is possible to achieve a high porosity of partition walls. In circumstances where a catalyst is loaded into the partition walls, pressure loss is low, and a heat capacity of the honeycomb structure is small, whereby it is possible to shorten time required for catalyst activation.

More specifically, the honeycomb structure of the present invention includes a porous supporting bulge disposed to extend out from a circumference of the outer wall so that a part of the outer wall is exposed. Furthermore, the supporting bulge has a plurality of support portions protruding from the circumference of the outer wall toward the outside of the outer wall, and at least one side wall portion supported by the support portions. Further in the honeycomb structure of the present invention, the partition walls and the outer wall of the honeycomb structure body and the support portions and the side wall portion of the supporting bulge are all formed monolithically by formation of a ceramic raw material. That is, in the honeycomb structure of the present invention, the outer wall of the honeycomb structure body is not made of the circumferential coating material, but is formed monolithically with the other constituent elements (e.g., the partition walls, the support portions and the side wall portion). Therefore, the thermal shock resistance of the honeycomb structure is remarkably high. Here, the honeycomb structure of the present invention includes the porous supporting bulge disposed to extend out from the circumference of the outer wall, whereby when the honeycomb structure is received in the can member, movement of the honeycomb structure body in a cell extending direction can be inhibited by the supporting bulge. Consequently, according to the honeycomb structure of the present invention, it is not necessary to apply a high holding pressure to the honeycomb structure. Therefore, even when a thickness of the partition walls of the honeycomb structure is decreased or a porosity of a substrate is increased to decrease an isostatic strength of the honeycomb structure, it is possible to inhibit the honeycomb structure from being damaged by the holding pressure.

DETAILED DESCRIPTION OF THE INVENTION

Hereinafter, embodiments of the present invention will be described, but the present invention is not limited to the following embodiments. Therefore, it should be understood that the following embodiments, to which changes, improvements and the like are suitably added on the basis of ordinary knowledge of a person skilled in the art without departing from the gist of the present invention, also fall in the scope of the present invention.

(1) Honeycomb Structure:

One embodiment of a honeycomb structure of the present invention is directed to such a honeycomb structure 100 as shown in FIG. 1A to FIG. 1D. As shown in FIG. 1A to FIG. 1D, the honeycomb structure 100 includes a pillar-shaped honeycomb structure body 107, a porous supporting bulge 106 provided on the honeycomb structure body 107, and plugging portions 120 arranged in open ends of cells 104. The honeycomb structure body 107 includes porous partition walls 101 defining and forming the plurality of cells 104 which become through channels for fluid and extend from an inflow end face 102 to an outflow end face 103, and a porous outer wall 105 surrounding the partition walls 101. The supporting bulge 106 is disposed to extend out from a circumference of the outer wall 105 so that at least a part of the outer wall 105 of the honeycomb structure body 107 is exposed. The supporting bulge 106 has a plurality of support portions 106a protruding from the circumference of the outer wall 105 toward the outside of the outer wall 105, and one side wall portion 106b supported by the support portions 106a. The plugging portions 120 are arranged in the open ends of the predetermined cells 104 in the inflow end face 102 and the open ends of the residual cells 104 in the outflow end face 103, to plug one open end of each cell 104. In the honeycomb structure 100 of the present embodiment, the partition walls 101 and the outer wall 105 of the honeycomb structure body 107 and the support portions 106a and the side wall portion 106b of the supporting bulge 106 are all formed monolithically by formation of a ceramic raw material.

As described above, in the honeycomb structure 100 of the present embodiment, the outer wall 105 of the honeycomb structure body 107 is not formed by a circumferential coating material, but is formed monolithically with the partition walls 101, the support portions 106a, the side wall portion 106b, and another constituent element. Therefore, a thermal shock resistance of the honeycomb structure 100 of the present embodiment is remarkably high. The honeycomb structure 100 of the present embodiment also includes the porous supporting bulge 106 disposed to extend out from the circumference of the outer wall 105. Consequently, when the honeycomb structure is received in a can member, movement of the honeycomb structure body 107 in a cell extending direction can effectively be inhibited by the supporting bulge 106. In consequence, according to the honeycomb structure 100 of the present embodiment, it is not necessary to apply a high holding pressure to the honeycomb structure 100. Therefore, even when a thickness of the partition walls 101 of the honeycomb structure 100 is decreased or a porosity of a substrate is increased to decrease an isostatic strength of the honeycomb structure 100, it is possible to inhibit the honeycomb structure 100 from being damaged by the holding pressure.

Figure 1A:
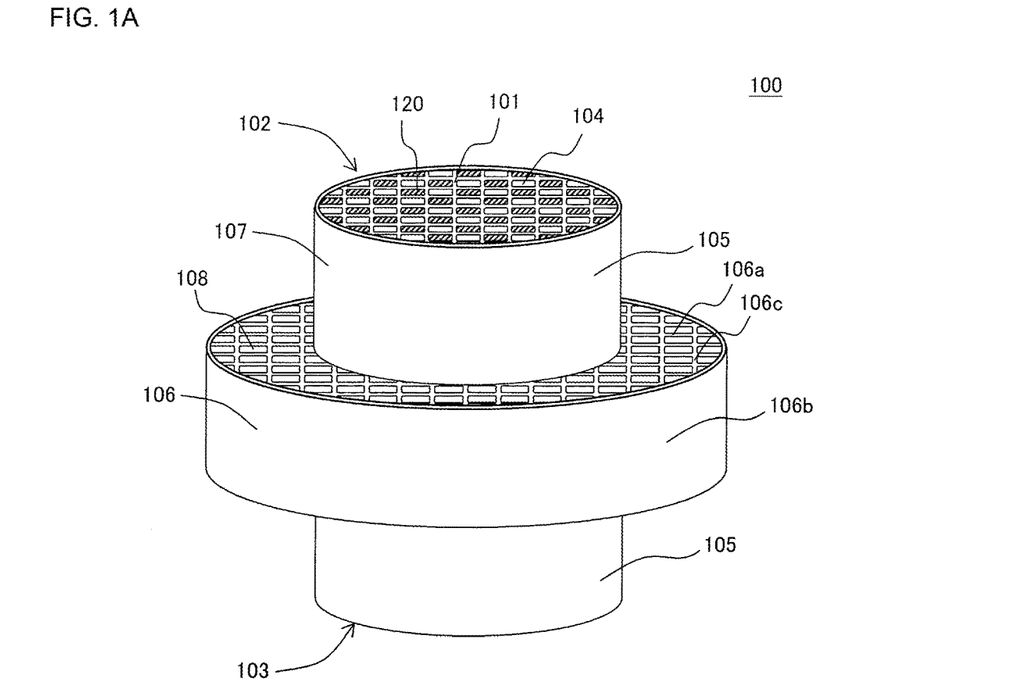
FIG. 1A is a perspective view schematically showing one embodiment of a honeycomb structure of the present invention as seen from an inflow end face side.
Figure 1B:
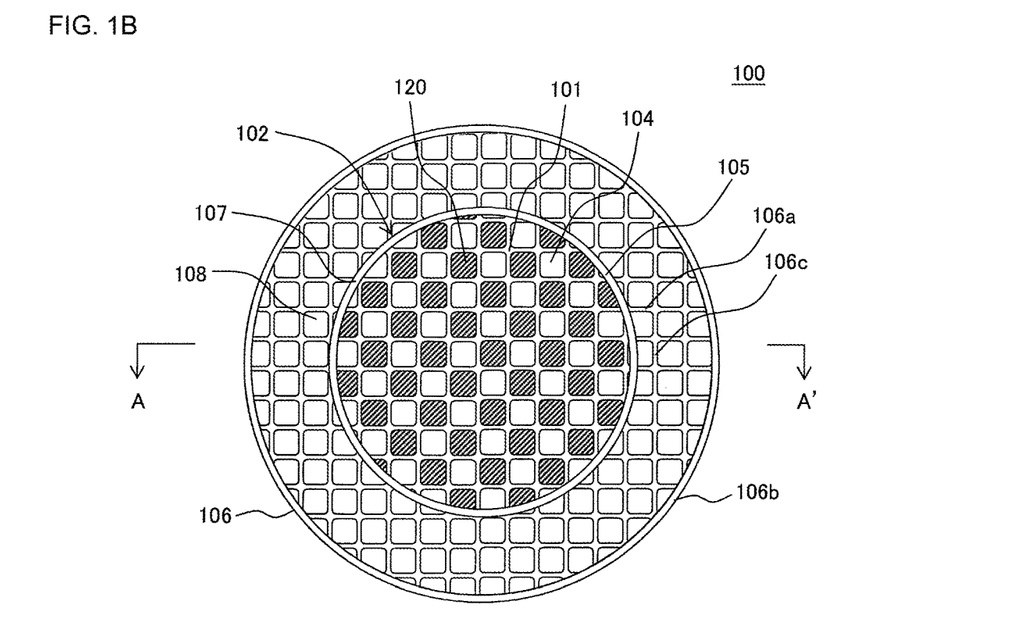
FIG. 1B is a plan view of the honeycomb structure of FIG. 1A seen from the inflow end face side.
Figure 1C:
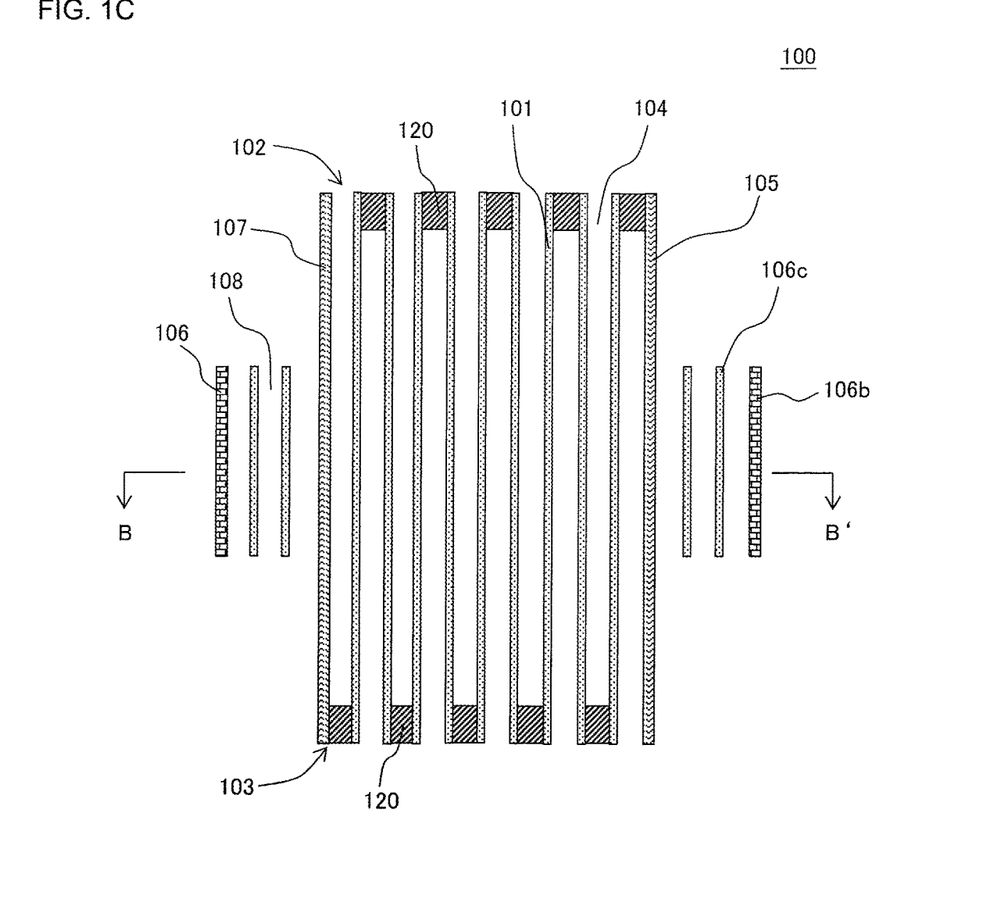
FIG. 1C is a cross-sectional view schematically showing a cross section along the A-A' line of FIG. 1B.
Figure 1D:
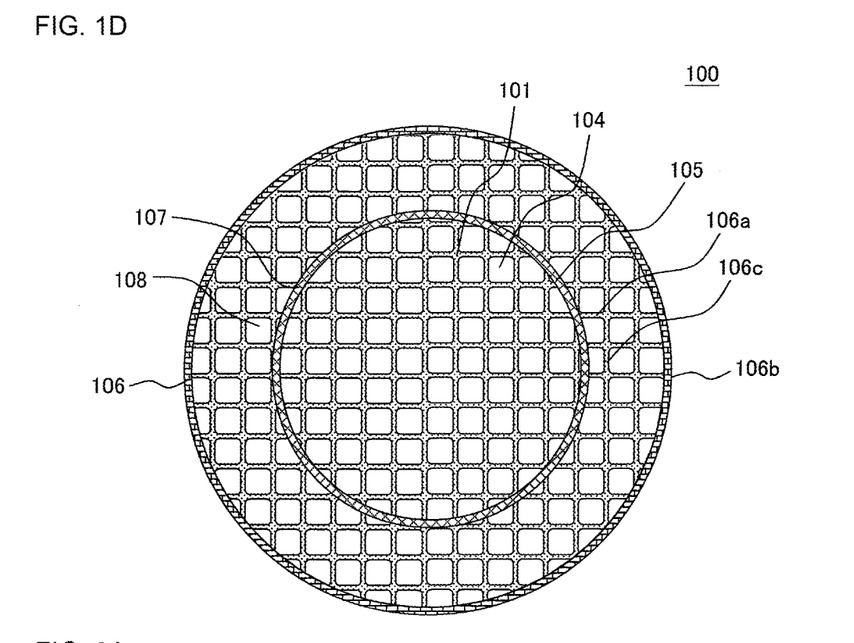
FIG. 1D is a cross-sectional view schematically showing a cross section along the B-B' line of FIG. 1C.

FIG. 1A is a perspective view schematically showing the one embodiment of the honeycomb structure of the present invention as seen from an inflow end face side. FIG. 1B is a plan view of the honeycomb structure of FIG. 1A seen from the inflow end face side. FIG. 1C is a cross-sectional view schematically showing a cross section along the A-A' line of FIG. 1B. FIG. 1D is a cross-sectional view schematically showing a cross section along the B-B' line of FIG. 1C.

Here, "monolithically formed" means that the partition walls 101, the outer wall 105, the support portions 106a and the side wall portion 106b are all formed seamlessly and continuously by monolithic formation or the like which uses the ceramic raw material. That is, when the honeycomb structure body 107 and the supporting bulge 106 are bonded via a bonding material and the outer wall 105 and the supporting bulge 106 are formed by using a coating material or the like to the honeycomb structure body 107, it is not meant that the constituent elements are "monolithically formed".

"The cell extending direction" means a central axis direction of the pillar-shaped honeycomb structure body. For example, in the round pillar-shaped honeycomb structure body 107 shown in FIG. 1A, "an extending direction of the cells 104" means a central axis direction of the round pillar-shaped honeycomb structure body 107.

When it is mentioned that "a part of the outer wall 105 is exposed", it is meant that the outer wall 105 of the honeycomb structure body 107 is not covered with the supporting bulge 106. Here, "a portion of the outer wall 105 which is covered with the supporting bulge 106" can be defined as follows. First, perpendiculars are virtually drawn from all points of a solid portion of the supporting bulge 106 toward a central line that is a line passing the center of the honeycomb structure body 107 and extending in the extending direction of the cells 104 of the honeycomb structure body 107. Then, a set of intersections at which the outer wall 105 of the honeycomb structure body 107 and the above-mentioned respective perpendiculars intersect becomes "the portion of the outer wall 105 which is covered with the supporting bulge 106". Therefore, a portion of the surface of the outer wall 105 which excludes the above "portion covered with the supporting bulge 106 (the set of the intersections)" is a portion which is not covered with the supporting bulge 106. It is to be noted that in a cross section of the honeycomb structure body which is vertical to the cell extending direction, "the center of the honeycomb structure body" is a point that becomes a geometric center of gravity of the cross section.

In the honeycomb structure 100 of the present embodiment, the supporting bulge 106 has the plurality of support portions 106a, one side wall portion 106b supported by the support portions 106a, and a plurality of beam portions 106c each of which is disposed between the support portions 106a. The respective support portions 106a of the supporting bulge 106 extend out from the circumference of the outer wall 105 of the honeycomb structure body 107. Each of the beam portions 106c is disposed between the support portions 106a to build a bridge across the support portions 106a. The beam portions 106c are also formed monolithically with the partition walls 101, the support portions 106a and the side wall portion 106b by the monolithic formation or the like which uses the ceramic raw material. The beam portions 106c are arranged in this way, so that a mechanical strength of the supporting bulge 106 can improve and it is possible to effectively inhibit supporting bulge cells 108 from being damaged. Here, it is assumed in the present description that parts (e.g., ends) of "the support portions 106a" extend from the circumference of the outer wall 105 (i.e., the parts are in contact with the circumference of the outer wall 105). In the present description, it is also assumed that "the beam portions 106c" are not in contact with the circumference of the outer wall 105, but are in contact only with the support portions 106a or in contact with the support portions 106a and the side wall portion 106b.

When the supporting bulge 106 has the plurality of support portions 106a, the plurality of beam portions 106c, and the side wall portion 106b, the supporting bulge 106 has spaces defined by the outer wall 105, the support portions 106a, the beam portions 106c, and the side wall portion 106b. Hereinafter, such spaces will be referred to as "the supporting bulge cells 108". It is preferable that the supporting bulge cells 108 are through-holes extending through the supporting bulge 106 from an inflow end face side to an outflow end face side. That is, in the honeycomb structure 100 of the present embodiment, the plurality of cells 104 are formed inside the outer wall 105 of the honeycomb structure body 107, and the plurality of supporting bulge cells 108 are formed between the outer wall 105 and the side wall portion 106b. The cells 104 are defined and formed by the partition walls 101, and the supporting bulge cells 108 are defined and formed by the support portions 106a and the beam portions 106c. The supporting bulge cells 108 are formed in the supporting bulge 106, whereby the honeycomb structure body 107 and the supporting bulge 106 achieve a stabilized structure. For example, when the supporting bulge 106 is a dense structure, during the formation of the ceramic raw material, or the like, the ceramic raw material might be unevenly formed toward a portion on the side of the supporting bulge 106, and formation defects might be generated in the partition walls 101 and the outer wall 105 of the honeycomb structure body 107.

In the honeycomb structure 100 of the present embodiment, in the cross section that is vertical to the extending direction of the cells 104, the thickness of the partition walls 101, a thickness of the support portions 106a and a thickness of the beam portions 106c may be the same or different. However, in the honeycomb structure 100 of the present embodiment, it is preferable that the thickness of the partition walls 101, the thickness of the support portions 106a and the thickness of the beam portions 106c are the same in the above cross section. According to this constitution, during preparation of the honeycomb structure 100 by extrusion or the like, a constitution of a forming die becomes simple. Furthermore, according to the constitution, there are advantages that clay can uniformly be extruded during the extrusion and that strength decrease can be inhibited by eliminating deformation of the partition walls which occurs when the clay is non-uniformly extruded.

In the honeycomb structure 100 of the present embodiment, it is preferable that a cell density of the cells 104 formed in the honeycomb structure body 107 and a cell density of the supporting bulge cells 108 formed in the supporting bulge 106 are the same. According to this constitution, the constitution of the forming die becomes simple during the preparation of the honeycomb structure 100 by the extrusion or the like.

In the honeycomb structure 100 of the present embodiment, it is preferable that the cell density of the cells 104 formed in the honeycomb structure body 107 and the cell density of the supporting bulge cells 108 formed in the supporting bulge 106 are the same. According to this constitution, there is the advantage that the constitution of the forming die becomes simple during the preparation of the honeycomb structure 100 by the extrusion or the like. For example, the cell density of the cells 104 formed in the honeycomb structure body 107 is preferably from 15.5 to 93 cells/cm$^2$, further preferably from 31 to 77.5 cells/cm$^2$, and especially preferably from 46.5 to 62 cells/cm$^2$. When the cell density of the cells 104 is smaller than 15.5 cells/cm$^2$, a filtering area might decrease during use as a filter, and rise of pressure loss in case of deposition of soot might extremely increase. When the cell density of the cells 104 is larger than 93 cells/cm$^2$, closing of the through channels due to the soot might occur to increase the pressure loss. A suitable example of the cell density of the supporting bulge cells 108 can be a numeric range that is similar to that of the above-mentioned cell density of the cells 104 formed in the honeycomb structure body 107.

In the honeycomb structure 100 of the present embodiment, an open frontal area of the cell 104 formed in the honeycomb structure body 107 and an open frontal area of the supporting bulge cell 108 formed in the supporting bulge 106 are the same. According to this constitution, there is the advantage that the constitution of the forming die becomes simple during the preparation of the honeycomb structure 100 by the extrusion or the like. Here, "the open frontal area of the cell 104" means an area of the open end of one cell 104 when all peripheries of the cell 104 are defined by the partition walls 101. Furthermore, "the open frontal area of the supporting bulge cell 108" means an area of the open end of one supporting bulge cell 108 when all peripheries of the supporting bulge cell 108 are defined by the support portions 106a and the beam portions 106c.

As hitherto described, a preferable mode of the honeycomb structure 100 of the present embodiment can be a honeycomb structure having a double tube structure including the honeycomb structure body 107 and the supporting bulge 106 in a portion in which the supporting bulge 106 is disposed.

There is not any special restriction on a shape of the cells 104 of the honeycomb structure body 107, but in the cross section that is vertical to the cell extending direction, the cell shape is preferably a polygonal shape such as a triangular shape, a quadrangular shape, a pentangular shape, a hexagonal shape or an octangular shape, a round shape or an elliptic shape, or may be an intermediate shape.

In the honeycomb structure of the present embodiment, the partition walls, the outer wall, the support portions, the beam portions and the side wall portion are all formed monolithically by the formation of the ceramic raw material. In this way, the honeycomb structure of the present embodiment is constituted so that any seams are not formed among the partition walls, the outer wall, the support portions, the beam portions and the side wall portion, whereby thermal expansion ratios of the respective constituent elements have remarkably close values (or the same value). Consequently, even when the honeycomb structure is used as an exhaust gas purifying filter and placed in situations where a high-temperature exhaust gas flows, it is possible to effectively inhibit the outer wall of the honeycomb structure body and the supporting bulge from being damaged. On the other hand, when the outer wall or the like of the honeycomb structure is coated with the circumferential coating material or the like as in a conventional honeycomb structure and even when the outer wall or the like and the circumferential coating material or the like are the same material, a remarkable difference might be generated in thermal expansion ratio between both the materials. Hereinafter, the honeycomb structure provided with the outer wall made of the circumferential coating material will occasionally be referred to as "a circumferentially coated honeycomb structure". Especially when the circumferentially coated honeycomb structure is used as the exhaust gas purifying filter through which the high-temperature exhaust gas flows, the thermal shock resistance of the circumferentially coated honeycomb structure might not be sufficient due to a difference in thermal expansion ratio between respective members. For example, in the circumferentially coated honeycomb structure obtained by extruding a cordierite forming raw material and coating its circumference with a circumferential coating material made of cordierite, the difference is made in thermal expansion ratio for the following reasons. In the cordierite forming raw material, kaolinite including hexagonal plate-shaped crystals is oriented along an inner side of a plane of partition walls when passing through an extruding die. In a subsequent firing process, hexagonal prismatic columnar-shaped cordierite crystals are generated in a direction at a right angle to crystals of kaolin, and hence the honeycomb structure is formed so that a c-axis direction of the cordierite crystals is parallel to the partition wall plane of the honeycomb structure. A thermal expansion coefficient of the cordierite crystals is anisotropic, and hence a thermal expansion ratio of the honeycomb structure obtained by extruding the cordierite forming raw material, followed by firing is different from a thermal expansion ratio of cordierite in a state where the crystals are not oriented. Therefore, in the circumferentially coated honeycomb structure further having an outer wall which is made of cordierite and applied as the circumferential coating material to the extruded honeycomb structure made of cordierite, the thermal shock resistance might decrease.

In a conventional honeycomb structure, from viewpoints of acquiring an isostatic strength of the honeycomb structure and acquiring receiving properties of the honeycomb structure into the can member, a porosity of partition walls and an outer wall of the honeycomb structure cannot be increased. However, in the honeycomb structure of the present embodiment, the partition walls, the outer wall, the support portions and the side wall portion are all formed monolithically, and hence even when its isostatic strength is lower than that of the conventional honeycomb structure, it is possible to acquire suitable receiving properties. Furthermore, as described above, the partition walls, the outer wall, the support portions and the side wall portion are all formed monolithically, and hence the honeycomb structure is also excellent in thermal shock resistance, so that it is possible to increase the porosity of the partition walls of the honeycomb structure body. In this way, it is possible to achieve a high porosity of the partition walls, and hence when a catalyst is loaded onto the insides of the partition walls, the pressure loss is low and a heat capacity of the honeycomb structure is small, so that it is possible to shorten time required for catalyst activation. The porosity of the partition walls and the outer wall of the honeycomb structure body is preferably from 46 to 75%, further preferably from 50 to 75%, and especially preferably from 55 to 75%. Hereinafter, the porosity of the partition walls and the outer wall of the honeycomb structure body will occasionally be referred to simply as "the porosity of the honeycomb structure body". When the porosity of the partition walls and the outer wall of the honeycomb structure body is 46% or less, the pressure loss might increase, and when the porosity is 75% or more, the isostatic strength of the honeycomb structure body might become insufficient. The porosity of the honeycomb structure body is a value measured by mercury porosimetry.

In the honeycomb structure of the present embodiment, a porosity of the supporting bulge is preferably from 46 to 75%, further preferably from 50 to 75%, and especially preferably from 55 to 75%. The porosity of the supporting bulge is an average porosity of a porosity of the support portions and a porosity of the side wall portion. However, when the supporting bulge has the support portions, the beam portions and the side wall portion, it is assumed that the porosity of the supporting bulge is an average porosity of the porosity of the support portions, the porosity of the beam portions and the porosity of the side wall portion. It is also preferable that the porosity of the honeycomb structure body and the porosity of the supporting bulge are both from 46 to 75%. A difference between the porosity of the honeycomb structure body and the porosity of the supporting bulge is preferably 3% or less, and further preferably 2% or less. According to this constitution, a heat capacity of the honeycomb structure body and a heat capacity of the supporting bulge are very close values (or the same value), stress concentration on a boundary portion can be inhibited, and the honeycomb structure is excellent in thermal shock resistance. The porosities of the honeycomb structure body and the supporting bulge are values measured by the mercury porosimetry.

In the honeycomb structure of the present embodiment, average pore diameters of the honeycomb structure body and the supporting bulge are both preferably from 11 to 30 µm and further preferably from 11 to 25 µm. The average pore diameters of the honeycomb structure body and the supporting bulge are values measured by the mercury porosimetry.

In the honeycomb structure of the present embodiment, it is preferable that the porosity of the partition walls and the outer wall of the honeycomb structure body and the porosity of the support portions, the beam portions and the side wall portion of the supporting bulge are both from 46 to 75% and that the average pore diameters of the honeycomb structure body and the supporting bulge are both from 11 to 30 µm. It is further preferable that the porosity of the partition walls and the outer wall of the honeycomb structure body and the porosity of the support portions, the beam portions and the side wall portion of the supporting bulge are both from 55 to 75% and that the average pore diameters of the honeycomb structure body and the supporting bulge are both from 11 to 25 µm. According to such a constitution, it is possible to achieve the high porosity of the partition walls, and when the catalyst is loaded onto the insides of the partition walls, the pressure loss is low and the heat capacity of the honeycomb structure is small, so that it is possible to shorten the time required for the catalyst activation.

The thickness of the partition walls of the honeycomb structure body is preferably from 0.14 to 0.41 mm, further preferably from 0.14 to 0.33 mm, and especially preferably from 0.14 to 0.31 mm. When the thickness is smaller than 0.14 mm, strength of the honeycomb substrate might deteriorate. When the thickness is larger than 0.41 mm, the pressure loss might increase. Furthermore, in case of treating the exhaust gas emitted from a gasoline engine, an amount of PM in the exhaust gas emitted from the gasoline engine is smaller than an amount of PM in an exhaust gas emitted from a diesel engine. Consequently, there is less fear that the cells are closed with the PM, and it is possible to increase the cell density. Therefore, it is preferable that the thickness of the partition walls is from 0.14 to 0.31 mm, for the purpose of improvement of balance between the strength and a trapping performance of the honeycomb structure. The thickness of the partition walls is a value measured by a method of observing, with an optical microscope, the cross section of the honeycomb structure which is vertical to the cell extending direction.

In the cross section of the honeycomb structure body which is vertical to the cell extending direction, the thickness of the support portions is preferably from 0.14 to 0.41 mm, further preferably from 0.14 to 0.33 mm, and especially preferably from 0.14 to 0.31 mm. When the thickness of the support portions is smaller than 0.14 mm, the strength of the support portions might deteriorate. When the thickness of the support portions is larger than 0.41 mm, it might be difficult to extrude the honeycomb structure, and a weight of the honeycomb structure might increase. Further in the cross section of the honeycomb structure body which is vertical to the cell extending direction, it is preferable that the thickness of the beam portions is the same as the thickness of the support portions. Furthermore, as described above, in the cross section of the honeycomb structure body which is vertical to the cell extending direction, it is more preferable that the thickness of the support portions and the beam portions is the same as the thickness of the partition walls of the honeycomb structure body. Furthermore, in view of improvement of the mechanical strength of the supporting bulge, the thickness of the support portions and the beam portions may be larger than the thickness of the partition walls of the honeycomb structure body.

In the cross section of the honeycomb structure body which is vertical to the cell extending direction, a thickness of the outer wall is preferably from 0.2 to 3.0 mm, further preferably from 0.3 to 2.5 mm, and especially preferably from 0.4 to 2.0 mm. According to this constitution, there are advantages that the outer wall is not broken in a catalyst step or a canning step (a step of receiving the honeycomb structure into the can member) and that it is possible to inhibit the pressure loss rise due to decrease of a filter effective area.

In the cross section of the honeycomb structure body which is vertical to the cell extending direction, a thickness of the side wall portion is preferably from 0.2 to 3.0 mm, further preferably from 0.3 to 2.5 mm, and especially preferably from 0.4 to 2.0 mm. When the thickness of the side wall portion is smaller than 0.2 mm, strength of the side wall portion might deteriorate. When the thickness of the side wall portion is larger than 3.0 mm, a large space occasionally has to be acquired to receive the honeycomb structure. It is to be noted that the thickness of the side wall portion is the shortest distance from a first surface (an inner surface) of the side wall portion which faces the outer wall to a second surface (an outer surface) on the side opposite to the above first surface of the side wall portion.

There is not any special restriction on a length L2 of the supporting bulge in the cell extending direction. For example, it is preferable that "L2/L1" that is a value obtained by dividing the length L2 of the supporting bulge in the cell extending direction by a length L1 of the honeycomb structure body in the cell extending direction is 0.01 or more and 0.8 or less. The "L2/L1" is further preferably 0.03 or more and smaller than 0.5 and especially preferably 0.05 or more and smaller than 0.2. Hereinafter, the length L2 of the supporting bulge in the cell extending direction will occasionally be referred to simply as "the length L2 of the supporting bulge". Furthermore, the length L1 of the honeycomb structure body in the cell extending direction will occasionally be referred to simply as "the length L1 of the honeycomb structure body". The length L1 of the honeycomb structure body is a length of the honeycomb structure body from the inflow end face to the outflow end face. The length L2 of the supporting bulge is a length of the supporting bulge from an end face on the inflow end face side to an end face on the outflow end face side. When "L2/L1" is smaller than 0.01, the mechanical strength of the supporting bulge might deteriorate. When "L2/L1" is in excess of 0.8, the length L1 of the supporting bulge excessively increases, and, for example, an installation space might excessively be required in an exhaust gas purifying device in which the honeycomb structure is used. Especially in a car-mounted use application in which the installation space is restricted, the length of the supporting bulge is shortened, which can achieve space saving.

The honeycomb structure of the present embodiment includes the supporting bulge disposed to extend out from the circumference of the honeycomb structure body so that at least a part of the outer wall of the honeycomb structure body is exposed. This supporting bulge has a plurality of support portions protruding from the circumference of the outer wall toward the outside of the outer wall, and at least one side wall portion supported by the support portions. Here, it is assumed that a surface area of a portion (an exposed portion) of the outer wall of the honeycomb structure body which is not covered with the supporting bulge is S1 and that a surface area of a portion of the outer wall of the honeycomb structure body which is covered with the supporting bulge is S2. In the supporting bulge of the honeycomb structure of the present embodiment, it is preferable that "S2/(S1+S2)" that is a value obtained by dividing a value of the surface area S2 by a sum of the surface area S1 and the surface area S2 is larger than 0.01 and smaller than 0.8. The value of "S2/(S1+S2)" is further preferably larger than 0.03 and smaller than 0.5, and especially preferably larger than 0.05 and smaller than 0.2. When the value of "S2/(S1+S2)" is smaller than 0.01, a ratio of the surface area S2 to a surface area (S1+S2) of the whole honeycomb structure body excessively decreases, and hence the mechanical strength of the supporting bulge might deteriorate. For example, at the time of receiving the honeycomb structure into the can member, the supporting bulge might be damaged by shearing stress generated in the support portions. When the value of "S2/(S1+S2)" is 0.8 or more, the ratio of the surface area S2 to the surface area (S1+S2) of the whole honeycomb structure body excessively increases, and hence the honeycomb structure might be hard to be received in the can member.

The surface area S2 of the portion covered with the supporting bulge is defined as follows. The perpendiculars are virtually drawn from all the points of the solid portion of the supporting bulge toward the central line that is the line passing the center of the honeycomb structure body and extending in the cell extending direction of the honeycomb structure body. Here, in the cross section of the honeycomb structure body which is vertical to the cell extending direction, "the center of the honeycomb structure body" is the point that becomes the geometric center of gravity of the cross section. The set of the intersections at which the outer wall of the honeycomb structure body and the above-mentioned respective perpendiculars intersect becomes "the portion of the outer wall which is covered with the supporting bulge". Therefore, an area of the above-mentioned "portion of the outer wall which is covered with the supporting bulge (the set of the intersections)" is "the surface area S2 of the portion covered with the supporting bulge". On the other hand, the portion of the surface of the outer wall which excludes the above "portion covered with the supporting bulge (the set of the intersections)" is the portion which is not covered with the supporting bulge. Therefore, an area of the above-mentioned "portion which is not covered with the supporting bulge" is "the surface area S1 of the portion (the exposed portion) which is not covered with the supporting bulge". The sum of S1 and S2 is a geometric surface area of the outer wall of the honeycomb structure body.

There is not any special restriction on a shape of the honeycomb structure body (hereinafter occasionally referred to simply as "a sectional shape of the honeycomb structure body") in the cross section of the honeycomb structure body which is vertical to the cell extending direction. The sectional shape is preferably a polygonal shape such as a triangular shape, a quadrangular shape, a pentangular shape, a hexagonal shape or an octagonal shape, a round shape or an elliptic shape, or may be an intermediate shape. Furthermore, there is not any special restriction on a size of the honeycomb structure body, but it is preferable that its length in the cell extending direction is from 40 to 381 mm. When the length is adjusted in such a range, it is possible to acquire, in a limited space, a trapping volume in accordance with the amount of the PM to be emitted from any type of engine. When the length is shorter than 40 mm, a sufficient filtering area cannot be acquired, and the trapping performance might deteriorate. Furthermore, when the length is longer than 381 mm, improvement of the trapping performance cannot be expected much, and the pressure loss might rather increase. When balance between the trapping performance and the pressure loss is taken into consideration, the length of the honeycomb structure body is further preferably from 70 to 330 mm and especially preferably from 100 to 305 mm. This constitution is effective in case of arrangement of a plurality of honeycomb structures in series in the can member. A diameter of a bottom surface of the honeycomb structure body is suitably selected from the above range in accordance with an engine displacement or output.

It is preferable that ceramic is used as a main component in the honeycomb structure body and the supporting bulge. It is preferable that a material of the honeycomb structure body and the supporting bulge is specifically at least one selected from the group consisting of cordierite, mullite, alumina, spinel, silicon carbide, a silicon-silicon carbide based composite material, a silicon carbide-cordierite based composite material, lithium aluminum silicate, and aluminum titanate. Among these materials, cordierite that is excellent in thermal shock resistance is preferable. Furthermore, when it is mentioned that "ceramic is used as the main component", it is meant that the whole material contains 90 mass % or more of ceramic.

In the honeycomb structure 100, each of the plugging portions 120 which plug the open ends of the cells 104 is disposed in an end portion of the cell 104 on the side of the inflow end face 102 or the outflow end face 103. Therefore, the honeycomb structure body 107 in the honeycomb structure 100 of the present embodiment functions as the exhaust gas purifying filter to purify the exhaust gas. As hitherto described, in the honeycomb structure 100 of the present embodiment, the partition walls 101, the outer wall 105, the support portions 106a and the side wall portion 106b are all formed monolithically by the formation of the ceramic raw material, and hence the honeycomb structure is excellent in thermal shock resistance. Consequently, the honeycomb structure 100 of the present embodiment is suitably utilizable as the exhaust gas purifying filter for the gasoline engine in which the temperature of the exhaust gas easily rises.

In the honeycomb structure 100 of the present embodiment, it is preferable that the predetermined cells 104 in which the plugging portions 120 are arranged on the side of the inflow end face 102 and the residual cells 104 in which the plugging portions 120 are arranged on the side of the outflow end face 103 are arranged in a staggered manner. There is not any special restriction on a material of the plugging portions 120, but it is preferable to use ceramic as a main component. The material of the plugging portions 120 may be the same as the material of the partition walls 101 and the like of the honeycomb structure body 107, or may be different therefrom.

In the honeycomb structure 100 of the present embodiment, a distance t from the outer wall 105 of the honeycomb structure body 107 to the side wall portion 106b is preferably from 3 to 20 mm, further preferably from 3 to 15 mm, and especially preferably from 5 to 10 mm. Here, the distance t from the outer wall 105 of the honeycomb structure body 107 to the side wall portion 106b is the shortest distance from an outer surface of the outer wall 105 to an inner surface of the side wall portion 106b. When the distance t is shorter than 3 mm, a sticking portion of the supporting bulge shortens, and shift of the honeycomb structure cannot sufficiently be inhibited. When the distance t is longer than 20 mm, the supporting bulge excessively enlarges, and a large space might be acquired to receive the honeycomb structure. For example, as the can member that receives the honeycomb structure, an excessively large member might be required.

In the honeycomb structure of the present embodiment, the catalyst, e.g., a three-way catalyst may be loaded onto at least parts of the partition walls. In more detail, it is preferable that the catalyst is loaded onto the partition walls of the honeycomb structure body constituting the honeycomb structure. An amount of the catalyst to be loaded per unit volume of the honeycomb structure is preferably from 10 to 300 g/liter, further preferably from 10 to 250 g/liter, and most preferably from 10 to 200 g/liter. When the amount is smaller than 10 g/liter, it might be hard to exert a catalytic effect. When the amount is larger than 300 g/liter, pores of the partition walls are closed, the pressure loss accordingly increases, and a trapping efficiency might remarkably deteriorate.

In case of loading the catalyst onto the honeycomb structure of the present embodiment, it is preferable that the catalyst includes at least one selected from the group consisting of the three-way catalyst, an SCR catalyst, an $NO_x$ storage catalyst, and an oxidation catalyst. The three-way catalyst is a catalyst that mainly purifies hydrocarbons (HC), carbon monoxide (CO), and nitrogen oxides ($NO_x$). An example of the three-way catalyst is a catalyst including platinum (Pt), palladium (Pd) and rhodium (Rh). The SCR catalyst is a catalyst that selectively reduces components to be purified. Especially in a honeycomb catalyst body of the present embodiment, it is preferable that the SCR catalyst is a $NO_x$ selectively reducing SCR catalyst which selectively reduces $NO_x$ in the exhaust gas. A suitable example of the $NO_x$ selectively reducing SCR catalyst is a catalyst that selectively reduces and purifies $NO_x$ in the exhaust gas. Furthermore, an example of the SCR catalyst is a metal-substituted zeolite. Examples of a metal in the metal-substituted zeolite include iron (Fe) and copper (Cu). A suitable example of the zeolite is a beta zeolite. Furthermore, the SCR catalyst may be a catalyst containing, as a main component, at least one selected from the group consisting of vanadium and titania. Examples of the $NO_x$ storage catalyst include an alkali metal and/or an alkali earth metal.

Examples of the alkali metal include potassium, sodium and lithium. An example of the alkali earth metal is calcium. An example of the oxidation catalyst is a catalyst containing a noble metal. Specifically, it is preferable that the oxidation catalyst contains at least one selected from the group consisting of platinum, palladium and rhodium.

Next, a further embodiment of the honeycomb structure of the present invention will be described. The honeycomb structure of the present embodiment is directed to such a honeycomb structure 200 as shown in FIG. 2A to FIG. 2D. The honeycomb structure 200 of the present embodiment is constituted similarly to the honeycomb structure 100 shown in FIG. 1A to FIG. 1D except that inner portions of supporting bulge cells 108 formed by support portions 106a and beam portions 106c are filled with a space filling member 220. Thus, the inner portions of the supporting bulge cells 108 are filled with the space filling member 220, which can increase strength of a supporting bulge 106.

Figure 2A:
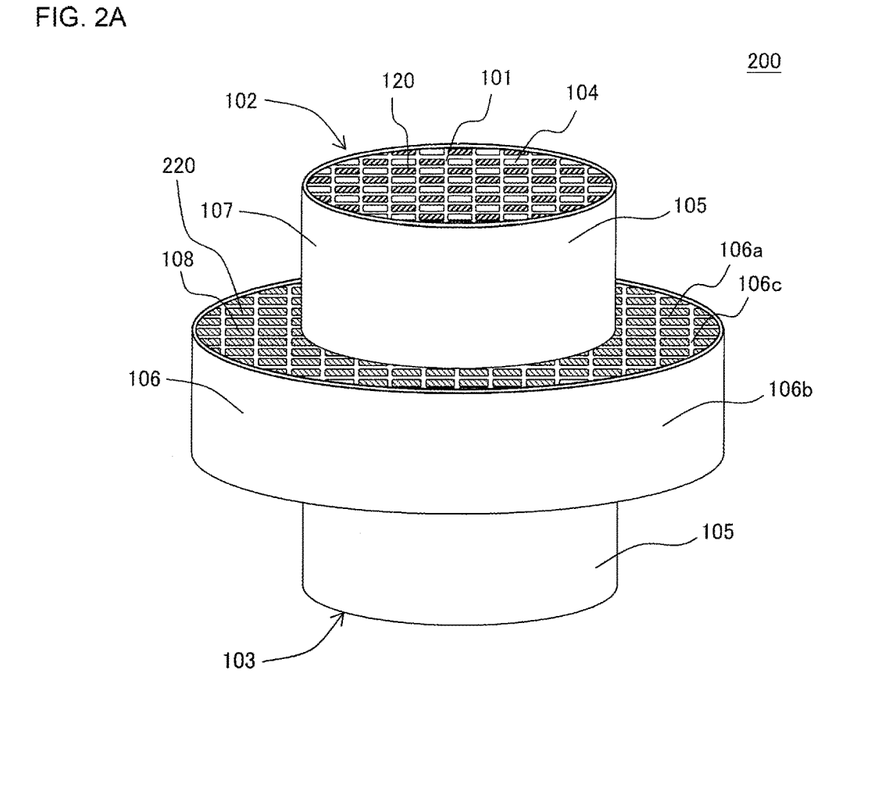
FIG. 2A is a perspective view schematically showing a further embodiment of the honeycomb structure of the present invention as seen from an inflow end face side.
Figure 2B:
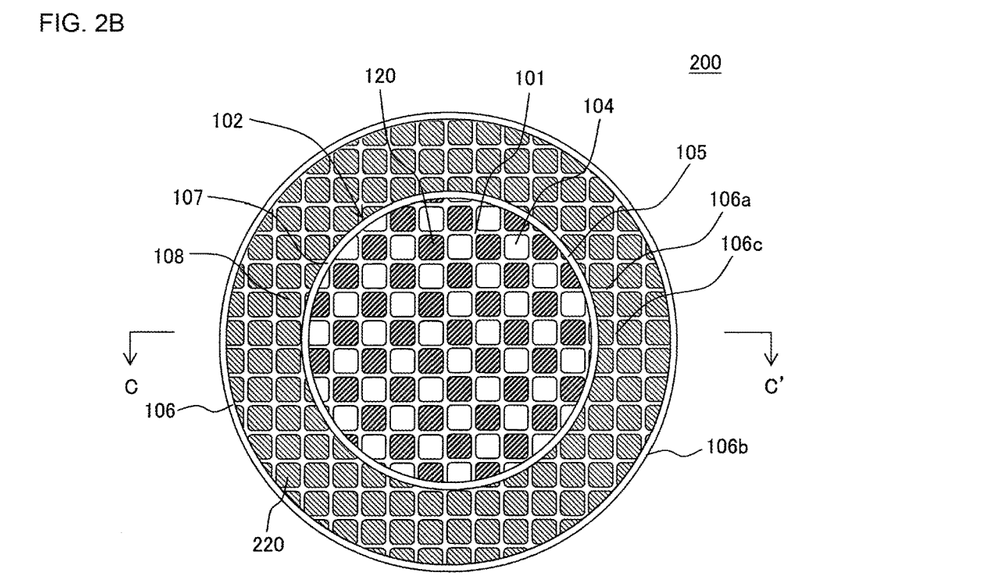
FIG. 2B is a plan view of the honeycomb structure of FIG. 2A seen from the inflow end face side.
Figure 2C:
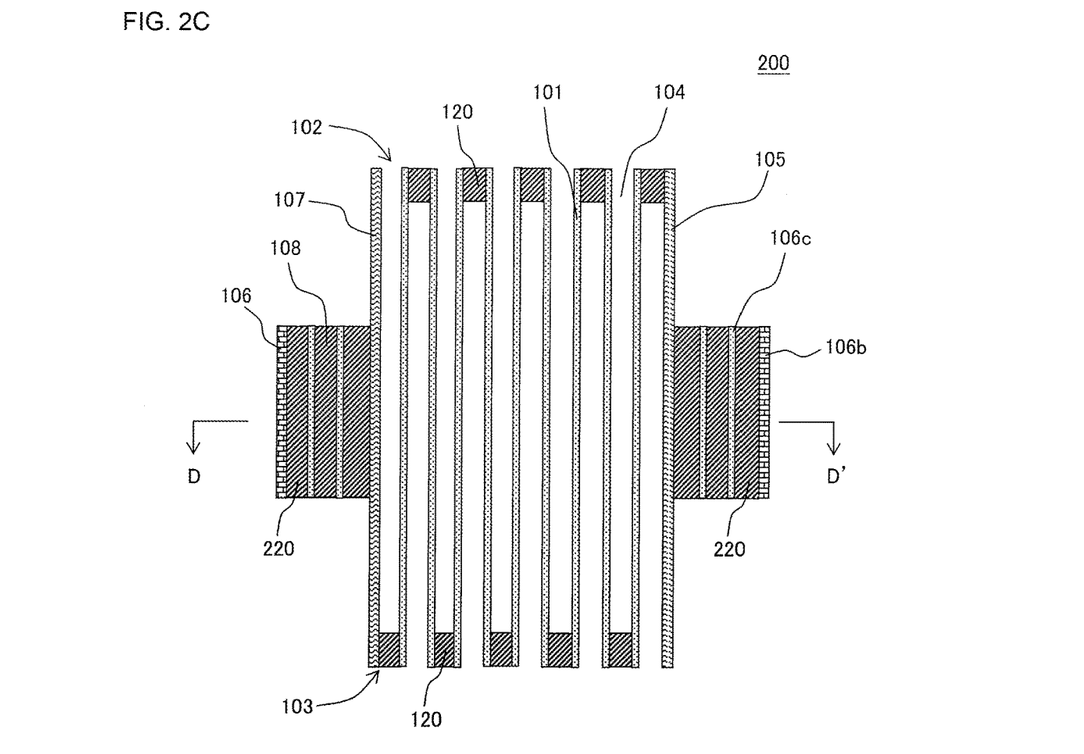
FIG. 2C is a cross-sectional view schematically showing a cross section along the C-C' line of FIG. 2B.
Figure 2D:
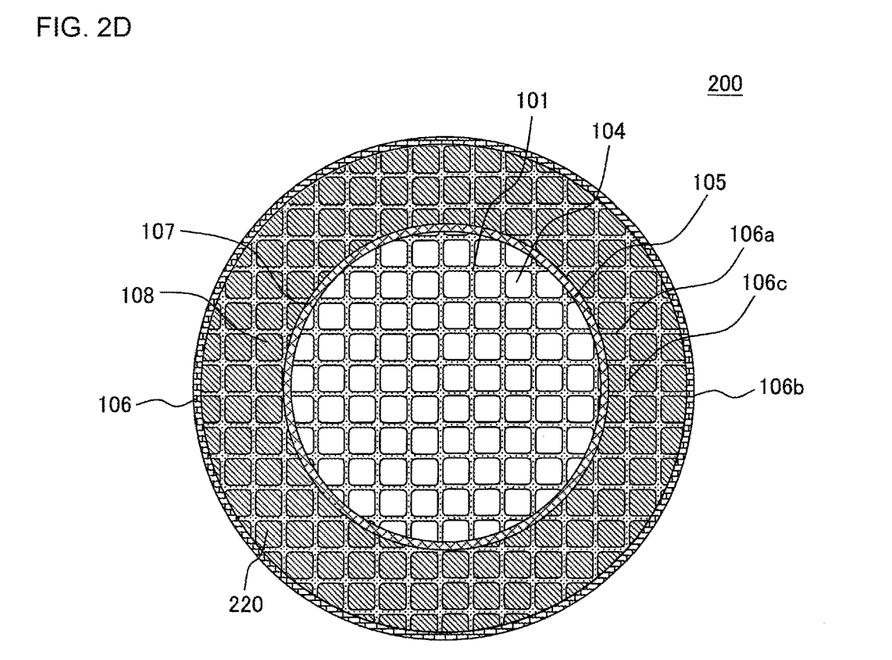
FIG. 2D is a cross-sectional view schematically showing a cross section along the D-D' line of FIG. 2C.

FIG. 2A is a perspective view schematically showing the further embodiment of the honeycomb structure of the present invention as seen from an inflow end face side. FIG. 2B is a plan view of the honeycomb structure of FIG. 2A seen from the inflow end face side. FIG. 2C is a cross-sectional view schematically showing a cross section along the C-C' line of FIG. 2B. FIG. 2D is a cross-sectional view schematically showing a cross section along the D-D' line of FIG. 2C. In FIG. 2A to FIG. 2D, constituent elements similar to those of the honeycomb structure 100 shown in FIG. 1A to FIG. 1D are denoted with the same reference numerals, and description thereof is occasionally omitted.

The space filling member 220 can be prepared, for example, by extruding the honeycomb structure 200 and charging a slurried material into the supporting bulge cells 108. Alternatively, the space filling member 220 may be prepared by extruding the honeycomb structure 200, followed by drying, or extruding the honeycomb structure 200, followed by drying and firing, and then charging the slurried material.

The space filling member 220 can be prepared, for example, by a material similar to that of plugging portions 120. In FIG. 2C, the space filling member 220 is charged into an entire region from an inflow end face side to an outflow end face side in the supporting bulge cells 108, but may be charged only into a part of the region from the inflow end face side to the outflow end face side.

Figure 3:
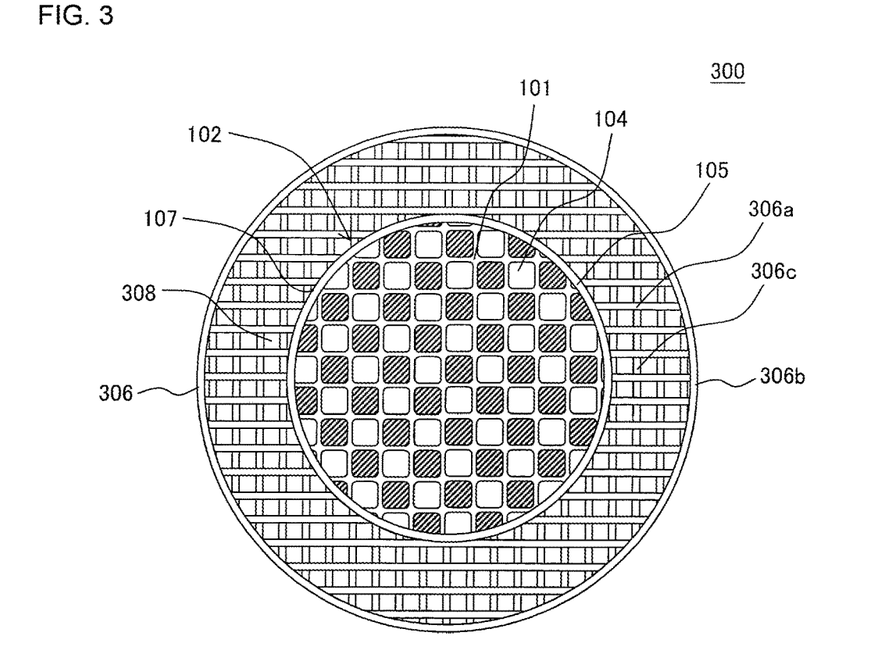
FIG. 3 is a plan view of a still further embodiment of the honeycomb structure of the present invention seen from an inflow end face side.

Next, a still further embodiment of the honeycomb structure of the present invention will be described. The honeycomb structure of the present embodiment is directed to such a honeycomb structure 300 as shown in FIG. 3. In the honeycomb structure 300 of the present embodiment, a thickness of support portions 306a and beam portions 306c is different from a thickness of partition walls of a honeycomb structure body 107. That is, in the honeycomb structure 300 of the present embodiment, a shape of supporting bulge cells 308 formed in a supporting bulge 306 is different from a shape of cells 104 formed in the honeycomb structure body 107. The honeycomb structure body 107 in the honeycomb structure 300 of the present embodiment is constituted similarly to the honeycomb structure body 107 of the honeycomb structure 100 shown in FIG. 1A to FIG. 1D. FIG. 3 is a plan view of the still further embodiment of the honeycomb structure of the present invention seen from an inflow end face side. In FIG. 3, constituent elements similar to those of the honeycomb structure 100 shown in FIG. 1A to FIG. 1D are denoted with the same reference numerals, and description thereof is occasionally omitted.

Also in the honeycomb structure 300 of the present embodiment, partition walls 101, an outer wall 105, the support portions 306a, the beam portions 306c and a side wall portion 306b are all formed seamlessly and continuously by monolithic formation or the like which uses a ceramic raw material. It is preferable that the thickness of the support portions 306a and the beam portions 306c is larger than a thickness of the partition walls 101 in a cross section of the honeycomb structure body 107 which is vertical to a cell extending direction. According to this constitution, a mechanical strength of the supporting bulge cells 308 can improve. It is to be noted that the supporting bulge 106 shown in FIG. 1A to FIG. 2D is formed along the whole circumference so that a distance t from the outer wall 105 of the honeycomb structure body 107 to the side wall portion 106b is uniform. Furthermore, the supporting bulge 306 shown in FIG. 3 is also formed to the honeycomb structure body 107 along the whole circumference so that a distance t from the outer wall 105 of the honeycomb structure body 107 to the side wall portion 306b is uniform. However, in the honeycomb structure of the present invention, the distance t from the outer wall of the honeycomb structure body to the side wall portion does not have to be uniform, and the supporting bulge does not have to be formed along the whole circumference, but may intermittently be formed.

(2) Manufacturing Method of Honeycomb Structure:

A method of manufacturing the honeycomb structure of the present invention will now be described.

First, a porous honeycomb structure body and a porous supporting bulge are prepared. Specifically, first a forming raw material is kneaded to obtain a kneaded material. It is preferable that the forming raw material is a ceramic raw material to which a dispersing medium and an additive are added. Examples of the additive include an organic binder, a pore former, and a surfactant. An example of the dispersing medium is water.

It is preferable that the ceramic raw material is at least one selected from the group consisting of a cordierite forming raw material, mullite, alumina, spinel, silicon carbide, a silicon-silicon carbide based composite material, a silicon carbide-cordierite based composite material, lithium aluminum silicate, and aluminum titanate. Among these materials, the cordierite forming raw material is preferable because the material has a small thermal expansion coefficient and is excellent in thermal shock resistance.

Particle diameters and a blend amount of the ceramic raw material for use as well as particle diameters and a blend amount of the pore former to be added are adjusted, whereby the honeycomb structure having desirable porosity and average pore diameter is obtainable.

There is not any special restriction on a method of kneading the forming raw material to form the kneaded material, and an example of the method is a method which uses a kneader, a vacuum pugmill or the like.

Next, the obtained kneaded material is extruded to obtain a honeycomb formed body. The honeycomb formed body is a monolithic extrusion of a honeycomb precursor and a supporting bulge precursor. The supporting bulge precursor is a portion which becomes a part of the supporting bulge when the honeycomb formed body is fired and which becomes the supporting bulge when the fired supporting bulge precursor is ground into a desirable shape. It is preferable that the supporting bulge precursor is disposed to cover an entire circumference of the honeycomb precursor. An example of the supporting bulge precursor is a precursor constituted of a plurality of support portion precursors and an annular side wall portion precursor supported by the plurality of support portion precursors. Furthermore, the supporting bulge precursor may further have beam portion precursors which couple the plurality of support portion precursors to one another in a circumferential direction of the supporting bulge precursor. The honeycomb precursor is a portion which is fired to become partition walls and an outer wall of the honeycomb structure body. Therefore, the honeycomb formed body prepared in manufacturing the honeycomb structure of the present invention is a pillar-shaped formed body of a double structure in which the supporting bulge precursor including the plurality of support portion precursors and the annular side wall portion precursor is disposed around the honeycomb precursor of a honeycomb shape.

The extrusion can be performed by using an extruding die in which slits are formed in accordance with a sectional shape of the honeycomb formed body. An example of this die is a die in which honeycomb slits to form the honeycomb precursor are formed in a central portion of the die and supporting bulge slits to form the supporting bulge precursor are formed to surround the honeycomb slits. The honeycomb slits are slits which are capable of forming partition walls having a desirable cell shape, cell density and partition wall thickness, and an outer wall having a desirable thickness. It is to be noted that a width of the slit to form the outer wall may be formed to be slightly broader in consideration of after-mentioned grinding. That is, the outer wall in the honeycomb precursor is beforehand formed to be thicker during the extrusion, and a portion having a predetermined thickness may be removed from the surface of the outer wall during the after-mentioned grinding. The supporting bulge slits are slits which are capable of forming the support portion precursors having a desirable shape and the side wall portion precursor having a desirable thickness. As a material of the die, cemented carbide that is hard to wear is preferable. When the supporting bulge has the beam portions, there are used, as the supporting bulge slits, slits which are capable of forming the support portion precursors having the desirable shape, the beam portion precursors having a desirable shape, and the side wall portion precursor having the desirable thickness.

Next, the honeycomb formed body is fired to obtain a honeycomb fired body. A firing temperature can suitably be determined in accordance with a material of the honeycomb formed body. For example, when the material of the honeycomb formed body is cordierite, the firing temperature is preferably from 1380 to 1450° C. and further preferably from 1400 to 1440° C. Furthermore, it is preferable that a firing time is adjusted into about 4 to 6 hours as time duration at the highest temperature.

The honeycomb formed body may be dried before fired. There is not any special restriction on a drying method, but examples of the drying method include hot air drying, microwave drying, induction drying, decompression drying, vacuum drying, and freeze drying. Among these methods, it is preferable that the induction drying, the microwave drying or the hot air drying is performed alone or any combination of the methods is performed. Furthermore, as drying conditions, it is preferable that a drying temperature is adjusted at 30 to 150° C. and a drying time is adjusted into 1 minute to 2 hours.

Next, the supporting bulge precursor of the obtained honeycomb fired body is ground into the desirable shape to form the supporting bulge. The grinding of the supporting bulge precursor may be performed after the honeycomb formed body is dried or before performing the firing. After the grinding of the supporting bulge precursor, the grinding of the outer wall may be performed after the honeycomb formed body is dried (i.e., prior to the firing) or after the firing is performed.

Next, open ends of cells of the honeycomb structure body of the obtained honeycomb fired body are plugged with a plugging material. An example of a method of plugging the open ends of the cells is a method of charging the plugging material into the open ends of the cells. The method of charging the plugging material can be performed in conformity with a heretofore known manufacturing method of a plugged honeycomb structure. As a ceramic raw material to form the plugging material, a ceramic raw material for use in the heretofore known manufacturing method of the honeycomb structure is usable, but it is preferable to use the same ceramic raw material as that used in preparation of the honeycomb formed body. It is to be noted that for the purpose of adjusting a porosity, pore diameters and the like of plugging portions formed by the plugging material, particle diameters and a blend amount of ceramic raw material powder as well as particle diameters and a blend amount of pore former powder to be added may suitably be changed.

After the plugging material is charged into the open ends of the cells, the plugging material is dried or fired, whereby the honeycomb structure of the present embodiment can be manufactured. A step of charging the plugging material into the open ends of the cells may be performed before firing the honeycomb formed body. A method of manufacturing the honeycomb structure of the present embodiment is not restricted to the hitherto described method.

EXAMPLES

Hereinafter, the present invention will specifically be described with reference to examples, but the present invention is not restricted to these examples.

Example 1

(Honeycomb Structure)

To 100 parts by mass of a cordierite forming raw material, there were added 13 parts by mass of a pore former, 35 parts by mass of a dispersing medium, 6 parts by mass of an organic binder and 0.5 part by mass of a dispersing agent, respectively, followed by mixing and kneading, to prepare a kneaded material. As the cordierite forming raw material, alumina, aluminum hydroxide, kaolin, talc and silica were used. Water was used as the dispersing medium, cokes having an average particle diameter of 1 to 10 µm were used as the pore former, hydroxypropyl methylcellulose was used as the organic binder, and ethylene glycol was used as the dispersing agent. Particle diameters and an amount of the pore former were controlled to control pore diameters and a porosity of partition walls.

Next, the kneaded material was extruded by using a predetermined die, to obtain a honeycomb formed body in which a honeycomb precursor having a quadrangular cell shape and a round pillar shape as the whole shape and a supporting bulge precursor surrounding an outer wall of the honeycomb precursor and having a hollow round pillar shape were monolithically extruded.

Next, the honeycomb formed body was dried with a microwave dryer, and further completely dried with a hot air dryer, and then both end faces of the honeycomb formed body were cut, to adjust the honeycomb formed body into a predetermined dimension. Next, a plugging slurry was charged into one open end of each cell of the honeycomb formed body to form plugging portions. The formation of the plugging portions were performed so that each end face of the honeycomb formed body possessed a checkerboard pattern by use of cells in which the plugging portions were formed in open ends and cells in which the plugging portions were not formed in the open ends. In a method of forming the plugging portions, a sheet was first attached to the end face of the honeycomb formed body and holes were made at positions of the sheet corresponding to the cells in which the plugging portions were to be formed. Next, in a state where the sheet remained to be attached, the end face of the honeycomb formed body was immersed into a plugging slurry obtained by preparing a plugging portion forming material in the form of the slurry, and the plugging slurry was charged into the open ends of the cells to be plugged through the holes made in the sheet. Then, the honeycomb formed body was dried with the hot air dryer, and further fired at 1410 to 1440° C. for 5 hours. A honeycomb fired body included a honeycomb structure body constituted of the honeycomb precursor, and a hollow round pillar-shaped supporting bulge disposed to cover a circumference of the honeycomb structure body prior to grinding. The supporting bulge before ground is a fired body of the supporting bulge precursor. A length of the honeycomb fired body in a cell extending direction was 91 mm.

Next, the supporting bulge of the honeycomb fired body before ground was ground. The grinding was performed in a range of 35.5 mm from one end face of the honeycomb fired body and a range of 35.5 mm from the other end face of the honeycomb fired body. By this grinding, the annular supporting bulge was formed and disposed to cover a position of 35.5 mm to a position of 55.5 mm from the one end face of the honeycomb fired body. In a honeycomb structure of Example 1, a length of the supporting bulge in the cell extending direction was 20 mm. Hereinafter, the length of the supporting bulge in the cell extending direction will occasionally be referred to simply as "the length of the supporting bulge". During this grinding in Example 1, the grinding was performed to obtain an outer diameter difference of ±1.0 μm in a portion (an exposed portion) of an outer wall of the honeycomb structure body which was not covered with the supporting bulge.

The honeycomb structure body of the obtained honeycomb structure had a round pillar shape in which a diameter (an outer diameter) of a cross section of the honeycomb structure body vertical to the cell extending direction was 118.4 mm and a length of the honeycomb structure body in the cell extending direction was 91.0 mm. A thickness of the partition walls was 0.25 mm and a cell density was 47 cells/cm². A thickness of the outer wall was 1 mm. A cell shape was quadrangular. Hereinafter, the length of the honeycomb structure body in the cell extending direction will occasionally be referred to simply as "the length of the honeycomb structure body".

The supporting bulge had support portions, beam portions and a side wall portion, and the support portions and the beam portions formed supporting bulge cells at the same cell density as in cells of the honeycomb structure body. In the supporting bulge, a shape of a cross section of the side wall portion which was vertical to a cell extending direction was a hollow circle, and a diameter of an outer circle of the hollow circle was 130.4 mm. In a cross section of the honeycomb structure which was vertical to the cell extending direction, a thickness of the support portions and the beam portions was 0.25 mm and a thickness of the side wall portion was 1 mm.

Next, the obtained honeycomb structure was received in a can member. The can member had therein a supporting receiving portion, and this supporting receiving portion came in contact with the supporting bulge of the honeycomb structure, whereby the honeycomb structure was supported to inhibit its movement in the cell extending direction.

Table 1 shows an outer diameter (mm) of the honeycomb structure body, a thickness (mm) of the partition walls, a porosity (%), an average pore diameter (μm), a preparation method of the outer wall, and presence of the supporting bulge. A mercury porosimeter was used in measurement of the porosity. Table 1 also shows a value of "S2/(S1+S2)", a distance t (mm), a thickness (mm) of the side wall portion, and a thickness (mm) of the support portions and beam portions. "S2/(S1+S2)" was obtained by the following method. It was assumed that a surface area of a portion (an exposed portion) of the outer wall of the honeycomb structure body which was not covered with the supporting bulge was S1 and that a surface area of a portion of the outer wall of the honeycomb structure body which was covered with the supporting bulge was S2. "S2/(S1+S2)" was a value obtained by dividing a value of the surface area S2 by a sum of the surface area S1 and the surface area S2. "The distance t (mm)" was the shortest distance from the outer wall of the honeycomb structure body to the side wall portion.

TABLE 1

| | Honeycomb structure body | | | | | Supporting bulge | | | |
|---|---|---|---|---|---|---|---|---|---|
| | Outer dia. (mm) | Thickness of partition walls (mm) | Porosity (%) | Ave. pore dia. (μm) | Preparation method of outer wall | Presence of supporting bulge | S2/ (S1 + S2) | Distance t (mm) | Thickness of side wall portion (mm) | Thickness of support portions and beam portions (mm) |
| Example 1 | 118.4 | 0.25 | 63 | 20 | Monolithic extrusion | Present | 0.22 | 6 | 1 | 0.254 |
| Example 2 | 118.4 | 0.25 | 46 | 20 | Monolithic extrusion | Present | 0.22 | 6 | 1 | 0.254 |
| Example 3 | 118.4 | 0.25 | 75 | 20 | Monolithic extrusion | Present | 0.22 | 6 | 1 | 0.254 |
| Example 4 | 118.4 | 0.25 | 63 | 11 | Monolithic extrusion | Present | 0.22 | 6 | 1 | 0.254 |
| Example 5 | 118.4 | 0.25 | 63 | 30 | Monolithic extrusion | Present | 0.22 | 6 | 1 | 0.254 |

TABLE 1-continued

| | Honeycomb structure body | | | | | | Supporting bulge | | |
|---|---|---|---|---|---|---|---|---|---|
| | Outer dia. (mm) | Thickness of partition walls (mm) | Porosity (%) | Ave. pore dia. (μm) | Preparation method of outer wall | Presence of supporting bulge | S2/ (S1 + S2) | Distance t (mm) | Thickness of side wall portion (mm) | Thickness of support portions and beam portions (mm) |
| Example 6 | 118.4 | 0.13 | 63 | 20 | Monolithic extrusion | Present | 0.22 | 6 | 1 | 0.254 |
| Example 7 | 118.4 | 0.41 | 63 | 20 | Monolithic extrusion | Present | 0.22 | 6 | 1 | 0.254 |
| Example 8 | 118.4 | 0.25 | 63 | 20 | Monolithic extrusion | Present | 0.01 | 6 | 1 | 0.254 |
| Example 9 | 118.4 | 0.25 | 63 | 20 | Monolithic extrusion | Present | 0.8 | 6 | 1 | 0.254 |
| Comp. Example 1 | 118.4 | 0.25 | 63 | 20 | Monolithic extrusion | None | 0 | 0 | — | — |
| Comp. Example 2 | 118.4 | 0.25 | 63 | 20 | Circumference coating | Present | 0.22 | 6 | 1 | 0.254 |
| Comp. Example 3 | 118.4 | 0.25 | 63 | 20 | Circumference coating | None | 0 | 0 | — | — |

Next, the obtained honeycomb structure was received in the can member. A buffer member constituted of a ceramic mat was disposed between the honeycomb structure and the can member. In Example 1, a holding pressure to be applied to the outer wall of the honeycomb structure was adjusted into 0.2 MPa. The holding pressure to be applied to the outer wall of the honeycomb structure was a value measured with a tactile sensor (a thickness of about 0.1 mm) manufactured by Nitta Corporation at room temperature of 25° C. Table 2 shows "the holding pressure" to be applied to the outer wall.

TABLE 2

| | Preparation method | Presence of supporting bulge | Shift test of honeycomb structure | Thermal shock resistance test | General evaluation |
|---|---|---|---|---|---|
| Example 1 | Monolithic extrusion | Present | None | 750 | A |
| Example 2 | Monolithic extrusion | Present | None | 750 | A |
| Example 3 | Monolithic extrusion | Present | None | 600 | B |
| Example 4 | Monolithic extrusion | Present | None | 750 | A |
| Example 5 | Monolithic extrusion | Present | None | 750 | A |
| Example 6 | Monolithic extrusion | Present | None | 600 | B |
| Example 7 | Monolithic extrusion | Present | None | 800 | A |
| Example 8 | Monolithic extrusion | Present | None | 750 | B |
| Example 9 | Monolithic extrusion | Present | None | 750 | A |
| Comp. Example 1 | Monolithic extrusion | None | Present | 750 | C |
| Comp. Example 2 | Circumference coating | Present | None | 550 | C |
| Comp. Example 3 | Circumference coating | None | Present | 550 | C |

The obtained honeycomb structures were evaluated in "a shift test of the honeycomb structure" and "a thermal shock resistance test" by the following methods. Table 2 shows the results. Furthermore, general evaluation was performed on the basis of the results of "the shift test of the honeycomb structure" and "the thermal shock resistance test". Table 2 shows the results.

(Shift Test of Honeycomb Structure)

The honeycomb structure received in the can member was mounted in an excitation tester to carry out a vibration test of the honeycomb structure. Vibration conditions in the vibration test were an acceleration of 30 G and a frequency of 100 Hz. Furthermore, in the vibration test, vibration was applied in a gas flow direction to carry out the test on the above vibration conditions for 30 hours. A gas emitted from a gas burner was passed through the honeycomb structure. In the vibration test, a temperature of the center of upstream at 10 mm from an inlet end face of the honeycomb structure was 700° C. After this vibration test, a state of the honeycomb structure received in the can member was confirmed. When the honeycomb structure moved in a gas current direction in the can member, the result was "present". On the other hand, when the honeycomb structure did not move in the gas current direction in the can member, the result was "none".

(Thermal Shock Resistance Test)

A thermal shock resistance test was carried out in a procedure stipulated in "JASO M505-87 Paragraph 6.7". A sample at room temperature was placed in an electric furnace held at a predetermined temperature and held for 20 minutes. The sample was taken outside, placed on a refractory brick, and cooled down to room temperature "while observing whether cracks are present or not". It is to be noted that the above cooling of the sample "while observing whether the cracks are present or not" is not stipulated in "JASO M505-87 Paragraph 6.7", and is an operation peculiar in the present "thermal shock resistance test". As the thermal shock resistance, there is obtained a maximum temperature difference (a temperature difference from room temperature: "the electric furnace temperature–room temperature") at which cracks are not present during observation of an appearance of the sample and tapping sound is metal sound when the whole circumference is lightly tapped with a metal rod (a rod made of iron and having a diameter of about 1 to 3 mm). When the cracks are generated or the tapping sound is not the metal sound, the result is "abnormal". The sample was the honeycomb structure onto which a catalyst was not loaded, a first predetermined temperature was set at "600° C.+room temperature", the temperature of the electric furnace was raised as much as 50° C. when there were not any abnormalities, and the test was repeated while raising the temperature as much as 50° C. at a time until the abnormality was generated. Five honeycomb structures were tested, and an average value of temperatures which were one stage lower than the temperature at which the abnormality was recognized (the temperature which was 50° C. lower than the temperature at which the abnormality was recognized) was obtained as the result of the thermal shock resistance test. Table 2 shows the above "maximum temperature difference". It is preferable that the maximum temperature difference is not lower than 600° C.

(General Evaluation)

From the result of "the shift test of the honeycomb structure" and the result of "the thermal shock resistance test", general evaluations of A, B and C were performed in accordance with the following evaluation criteria.

Evaluation "A": when the result of the shift test of the honeycomb structure is "none" and the result of the thermal shock resistance test is "700° C. or more", the evaluation is "A".

Evaluation "B": when the result of the shift test of the honeycomb structure is "none" and the result of the thermal shock resistance test is "600° C. or more and lower than 700° C.", the evaluation is "B".

Evaluation "C": when the result of the shift test of the honeycomb structure is "present" or the result of the thermal shock resistance test is "lower than 600° C.", the evaluation is "C".

Examples 2 to 9

In Examples 2 to 7, the procedure of Example 1 was repeated except that a thickness (mm) of partition walls, a porosity (%) and an average pore diameter (μm) were changed as shown in Table 1, to prepare honeycomb structures. On the other hand, in Examples 8 and 9, the procedure of Example 1 was repeated except that a length of each honeycomb structure and a length of each supporting bulge were changed, to prepare honeycomb structures. In Example 8, the length of the honeycomb structure was set to 152 mm and the length of the supporting bulge was set to 2 mm. In the honeycomb structure of Example 8, a value of "S2/(S1+S2)" was 0.01. In Example 9, the length of the honeycomb structure was set to 91 mm and a length of a supporting bulge was set to 75 mm. In the honeycomb structure of Example 9, a value of "S2/(S1+S2)" was 0.8.

Comparative Example 1

In Comparative Example 1, a honeycomb structure which did not have a supporting bulge was prepared. The honeycomb structure of Comparative Example 1 was constituted similarly to a honeycomb structure body in the honeycomb structure of Example 1.

Comparative Example 2

In Comparative Example 2, the procedure of Example 1 was repeated except that an outer wall of a honeycomb structure body was formed by a circumferential coating material, to prepare a honeycomb structure.

Comparative Example 3

In Comparative Example 3, a honeycomb structure which did not have a supporting bulge was prepared. Further in Comparative Example 3, an outer wall was formed by a circumferential coating material.

For the honeycomb structures of Examples 2 to 9 and Comparative Examples 1 to 3, "a shift test of the honeycomb structure" and "a thermal shock resistance test" were carried out. Table 2 shows the result. Furthermore, general evaluation was carried out on the basis of the results of "the shift test of the honeycomb structure" and "the thermal shock resistance test". Table 2 shows the result.

(Results)

As shown in Table 2, in the honeycomb structures of Examples 1 to 9, it was possible to obtain the suitable results in evaluations of both of "the shift test of the honeycomb structure" and "the thermal shock resistance test".

The honeycomb structure of Comparative Example 1 did not have the supporting bulge, and hence there was the shift of the honeycomb structure. In the honeycomb structure of Comparative Example 2, the outer wall was formed by the circumferential coating material, and hence the result of the thermal shock resistance test was lower than 600° C. The honeycomb structure of Comparative Example 3 did not have the supporting bulge, and the outer wall was formed by the circumferential coating material, so that there was the shift of the honeycomb structure, and the result of the thermal shock resistance test was lower than 600° C.

INDUSTRIAL APPLICABILITY

A honeycomb structure of the present invention is utilizable as an exhaust gas purifying filter.

DESCRIPTION OF REFERENCE NUMERALS 100, 200 and 300: honeycomb structure, 101: partition wall, 102: inflow end face, 103: outflow end face, 104: cell, 105: outer wall, 106 and 306: supporting bulge, 106a and 306a: support portion, 106b and 306b: side wall portion, 106c and 306c: beam portion, 107: honeycomb structure body, 108 and 308: supporting bulge cell, 120: plugging portion, and 220: space filling member.

The invention claimed is:

1. A honeycomb structure comprising:
a honeycomb structure body including porous partition walls defining and forming a plurality of cells which extend in a cell extending direction from an inflow end face to an outflow end face and become through channels for fluid, and a porous outer wall surrounding the partition walls, the honeycomb structure body has any one of a round, elliptic, triangular, quadrangular, pentagonal, hexagonal or octagonal shape in a cross-section of the honeycomb structure body in a direction perpendicular to the cell extending direction;

a porous supporting bulge disposed to extend out from a circumference of the outer wall so that at least a part of the outer wall is exposed; and plugging portions arranged in open ends of predetermined cells in the inflow end face and open ends of residual cells in the outflow end face, wherein the supporting bulge has a plurality of support portions protruding from the circumference of the outer wall toward the outside of the outer wall, and at least one side wall portion supported by the support portions, and the partition walls and the outer wall of the honeycomb structure body and the support portions and the side wall portion of the supporting bulge are all formed monolithically from the same ceramic raw material and additives.

2. The honeycomb structure according to claim 1, wherein porosities of the honeycomb structure body and the supporting bulge are both from 46 to 75%.

3. The honeycomb structure according to claim 1, wherein average pore diameters of the honeycomb structure body and the supporting bulge are both from 11 to 30 μm.

4. The honeycomb structure according to claim 1, wherein a thickness of the partition walls of the honeycomb structure body is from 0.14 to 0.41 mm.

5. The honeycomb structure according to claim 1, wherein the supporting bulge further has a plurality of beam portions which are formed monolithically with the support portions and each of which is disposed between two of the plurality of support portions.

6. The honeycomb structure according to claim 5, wherein the supporting bulge has supporting bulge cells defined by the outer wall of the honeycomb structure body, the support portions of the supporting bulge, the beam portions of the supporting bulge, and the side wall portion of the supporting bulge, and the supporting bulge cells are through-holes passing through the supporting bulge from the side of the inflow end face to the side of the outflow end face.

7. The honeycomb structure according to claim 5, wherein in a cross section which is vertical to an extending direction of the cells, the thickness of the partition walls, a thickness of the support portions and a thickness of the beam portions are the same.

8. The honeycomb structure according to claim 5, wherein a cell density of the cells formed in the honeycomb structure body and a cell density of the supporting bulge cells formed in the supporting bulge are the same.

9. The honeycomb structure according to claim 1, wherein a value obtained by dividing a surface area S2 of a portion of the outer wall of the honeycomb structure body which is covered with the supporting bulge by a sum of a surface area S1 of a portion of the outer wall of the honeycomb structure body which is not covered with the supporting bulge and the surface area S2 satisfies the following relation (1):

$$0.01 < S2/(S1+S2) < 0.8 \qquad (1).$$

* * * * *